June 9, 1925.
S. B. NEWBERRY
CONTINUOUS KILN
Filed May 24, 1922
1,541,169
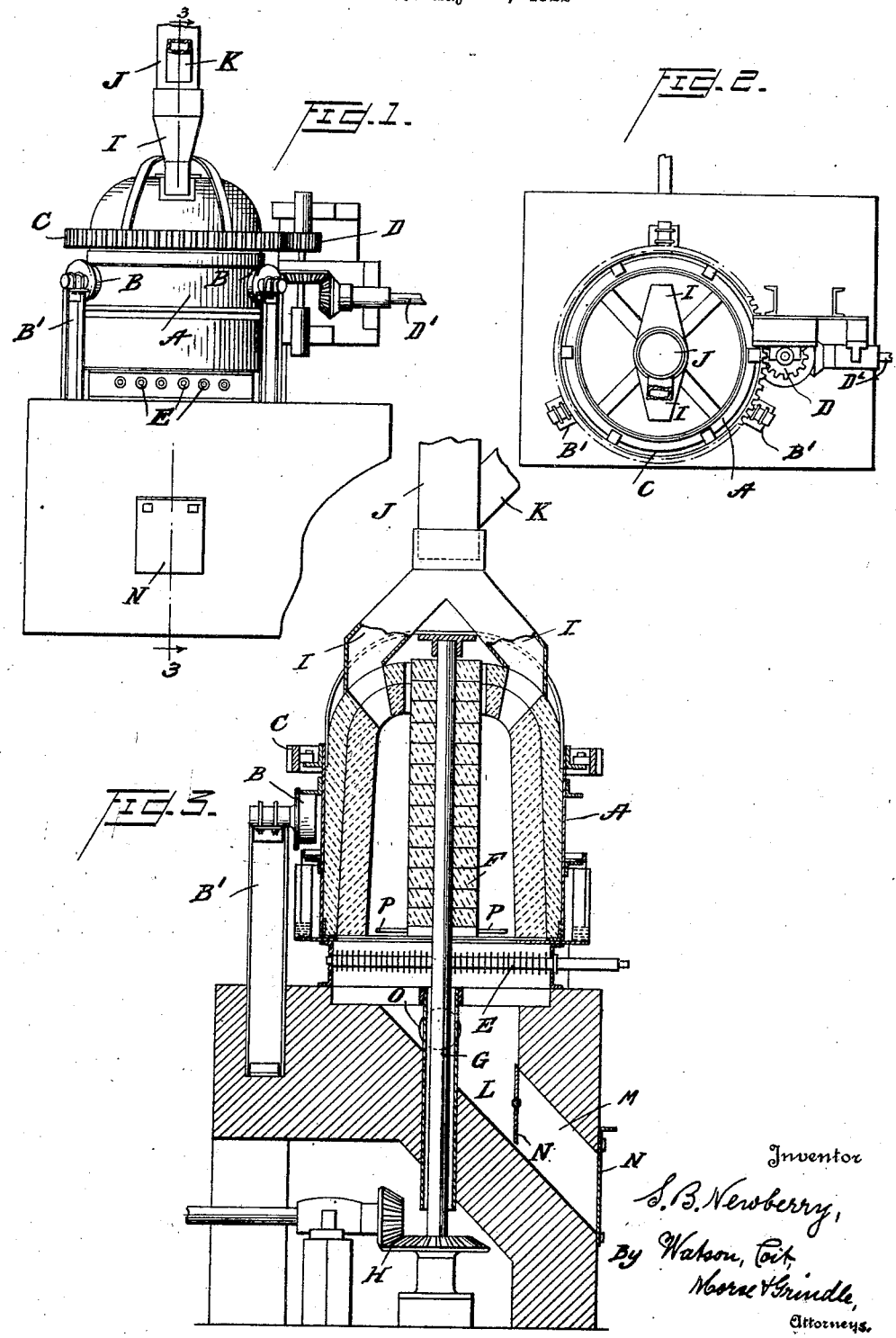
Inventor
S. B. Newberry,
By Watson, Coit,
Morse & Grindle,
Attorneys.

Patented June 9, 1925.

1,541,169

UNITED STATES PATENT OFFICE.

SPENCER B. NEWBERRY, OF CLEVELAND, OHIO; ANDREW W. NEWBERRY, EXECUTOR OF SAID SPENCER B. NEWBERRY, DECEASED, ASSIGNOR OF ONE-HALF TO ANDREW W. NEWBERRY AND ONE-HALF TO ARTHUR C. NEWBERRY.

CONTINUOUS KILN.

Application filed May 24, 1922. Serial No. 563,268.

*To all whom it may concern:*

Be it known that I, SPENCER B. NEWBERRY, a citizen of the United States, and residing at Cleveland, Cuyahoga County, State of Ohio, have invented certain new and useful Improvements in Continuous Kilns, of which the following is a specification.

This invention relates to a vertical, continuous kiln for the burning of cement mixture or other materials with the addition of finely ground and admixed fuel. The process which this kiln is designed to carry out consists in grinding the raw mixture with the addition of the necessary admixed fuel, which may be coke, anthracite coal or bituminous coal of quite high ash content, the ash serving as part of the mixture and furnishing all or part of the argillaceous material needed for the composition of cement. The finely ground raw mixture consisting of calcareous material such as limestone or marl, argillaceous material such as clay or shale, and admixed fuel, is moistened to a stiff plastic condition, molded into solid masses by compressing into briquettes or squeezing out in the form of cylinders by an auger brick machine, or nodulized in the form of rounded masses by passing through a dryer and screening out fine material. The mixture so prepared is fed in at the top of the kiln herein described, which consists of a vertical cylindrical chamber, either stationary or revolving about a vertical axis, and containing a central revolving core. The material passes spirally downwardly through the annular space between the cylinder and the core, and in its passage is subjected to a strong blast of air passing up through the annular space, under sufficient pressure to complete the combustion of the admixed fuel. This combustion develops a very intense heat in the upper portion of the charge, and the calcined product is discharged at the bottom of the kiln through grate bars, in the form of clinker.

The accompanying drawings show the essential features of the apparatus. In these drawings:

Figure 1 is a view of the apparatus in elevation;

Figure 2 is a plan view of the same; and

Figure 3 is a vertical sectional view substantially on the line 3—3 of Figure 1.

Referring to the drawings in detail, A is a cylindrical shell lined with refractory brick and supported by means of a flange or track $A^1$ which rests on a plurality of rollers B, carried by standards B'. The shell may be caused to revolve by the gear C which is secured thereto and which is driven by the pinion D operated from the shaft D' or other suitable source of power. Under the kiln are the grate bars E which are wholly or partly revolved by mechanism not shown. The kiln A is preferably slightly tapered, being of somewhat greater diameter at the bottom than at the top. Axially placed in the center of the kiln A is a core F, composed of refractory brick, carried on the vertical shaft G and revolved by the gear and pinion H. The foregoing construction produces an annular calcining space between the core and the inner wall of the shell. At the top of the kiln are flues I—I, revolubly connected with the stack J, for the escape of products of combustion. Into the stack J discharges a feed chute K for supply of raw material to the kiln. The clinker discharged through the grate bars E falls into a hopper L and finally escapes through the chute M, provided with doors N, which permit discharge without material loss of air pressure. The air blast enters the hopper L from a blower through the air pipe O. At the bottom of the revolving central core are two or more projecting bars P—P which serve to keep the charge in the kiln in agitation.

The apparatus above described may be successfully operated by revolving both the outer shell and the central core in opposite directions and at suitable speeds. I have found however that revolving the outer shell of the kiln is not strictly necessary, and that good results may be obtained by keeping the shell A stationary and revolving the central core only. If it is desired to operate the kiln in this manner, the driving mechanism of the shell and the supporting rollers B may be left stationary or omitted. It is also practicable to allow the central core to remain stationary and to revolve the outer shell only. If this mode of operation is adopted the driving mechanism of the central core may be left stationary or omitted.

The effect of revolving either the outer shell and the central core, or both shell and core, is to keep the charge in constant motion and to cause it to descend spirally from the top to the bottom of the kiln, and thus to promote the uniform passage of air through the charge and to prevent the charge from cohering into dense masses and thus obstructing the uniformity of the burning and the regularity of the descent and discharge of the calcined product.

The operation of the appartus is briefly as follows:

The kiln is first charged with fuel, such as charcoal or coke, and kept in full combustion by the air blast. When the interior of the kiln is red hot, the mixed material containing the admixed fuel and in the form of solid masses as above described, is fed in regularly through the feed chute K, passes down through the flues I—I, and enters the annular space between the outer shell A and the central core F. In this space the combustion of the admixed fuel takes place vigorously and the charge gradually descends spirally to the bottom of the kiln from which it issues through the grate bars E in the form of clinker. This clinker passes through the hopper L and is discharged through the doors or gates N—N. Side holes through the wall of the shell or cylinder A, not shown in the drawing, permit inspection necessary to keep the burning zone at proper and uniform level. This level is maintained by correct adjustment of the feed of raw material and the discharge of clinker.

I have obtained very successful results with this apparatus in burning cement mixtures with the addition of one hundred pounds of coke for each six hundred pounds of raw mixture, producing one barrel or three hundred eighty pounds of clinker.

Having thus described my invention what I claim as new and desire to secure by Letters Patent is:

1. A kiln for calcining materials comprising a hollow shell the inner wall of which is substantially straight from the bottom to the top thereof, a substantially cylindrical core arranged in said shell and spaced from the inner wall thereof and extending upwardly and terminating adjacent the top of the shell, the space between said shell and core being unobstructed and forming an annular calcining space, means for supplying materials to be calcined to the upper portion of said space, and means for producing relative motion between said shell and core to cause the materials to travel spirally downwardly through said space during the calcining operation.

2. A kiln for calcining materials comprising a hollow shell having a space therein which tapers slightly and uniformly from the bottom toward the top thereof, a substantially cylindrical core arranged in said shell and spaced from the inner wall thereof and extending upwardly and terminating adjacent the top of the shell, the space between said shell and core being unobstructed and forming an annular calcining space which tapers uniformly from the bottom to the top thereof, means for supplying materials to be calcined to the upper portion of said space, and means for producing relative motion between said shell and core to cause the materials to travel spirally downwardly through said space during the calcining operation.

3. A kiln for the calcination of materials containing admixed fuel consisting of a vertical shell, a vertical central core extending upwardly into said shell, said core being spaced from the inner wall of said shell, whereby an annular calcining space is formed between the shell and core, means for supplying air to said space, means for supplying material containing admixed fuel to said space, and means for imparting to the vertical shell a revolving motion to cause the material to travel downwardly through said space.

4. A kiln for the calcination of materials containing admixed fuel consisting of a vertical shell, a vertical central core spaced from the inner wall of said shell, whereby a space is formed between the shell and core, means for supplying air to said space, means for supplying materials to be calcined to said space, and means for revolving both the shell and core.

5. A kiln for the calcination of materials containing admixed fuel consisting of a vertical shell, a vertical central core spaced from the inner wall of said shell and extending upwardly into the shell, whereby an annular calcining space is formed between the shell and core, means for supplying air under pressure to the annular space, means for revolving the vertical shell, means for supplying material containing admixed fuel at the top of the annular space, means for discharging calcined product at regulated speed at the bottom of the annular space without material loss of air pressure.

6. A kiln for the calcination of materials containing admixed fuel consisting of a vertical shaft, a vertical central core spaced from the inner wall of said shell, whereby an annular space is formed between the shaft and core, means for supplying air under pressure to the annular space, means for revolving both the shell and core, means for supplying material containing admixed fuel at the top of the annular space, means for discharging calcined product at regulated speed at the bottom of the annular space without material loss of air pressure.

7. A calcining kiln of the kind described comprising a shell, a core arranged vertically in said shell and spaced from the inner wall thereof, means for supplying air and material to be calcined to the space between said shell and core, and means for rotating said core and said shell about a vertical axis.

In testimony whereof I hereunto affix my signature.

SPENCER B. NEWBERRY.